May 2, 1950 J. W. L. SEKKEL 2,506,240
MEASURING TRAP CHAMBER WITH ADJUSTABLE
FLOAT CONTROLLED CUTOFF
Filed Oct. 27, 1945 2 Sheets-Sheet 1
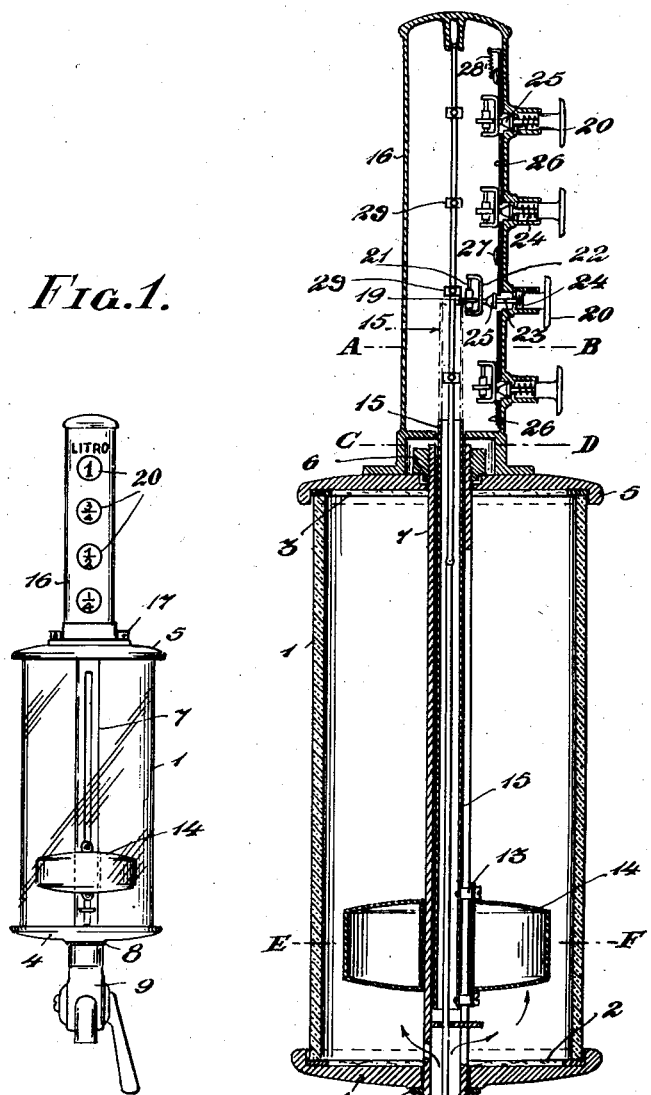
Fig.1.
Fig.2.
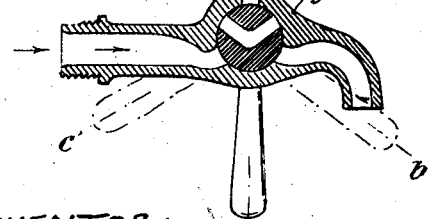
INVENTOR:
Juan Werner Luis Sekkel
By John C. Brady
attorney.

May 2, 1950
J. W. L. SEKKEL
2,506,240
MEASURING TRAP CHAMBER WITH ADJUSTABLE
FLOAT CONTROLLED CUTOFF
Filed Oct. 27, 1945
2 Sheets-Sheet 2
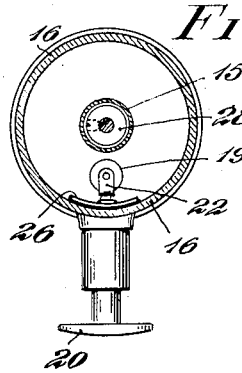
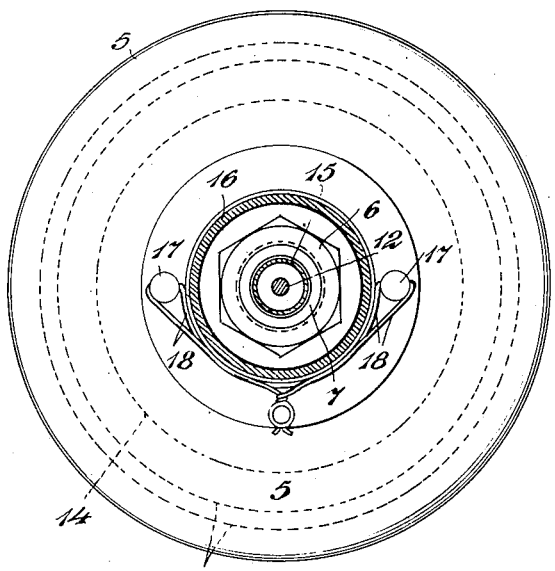
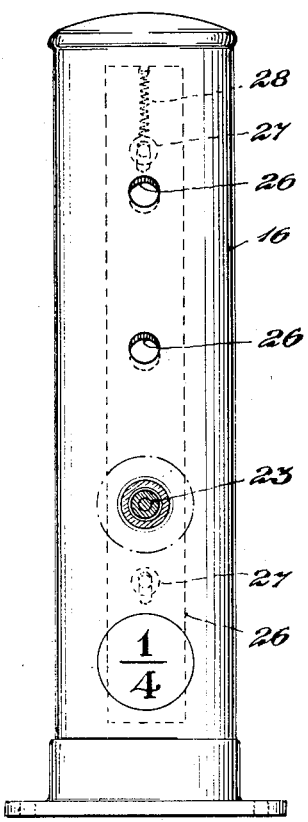
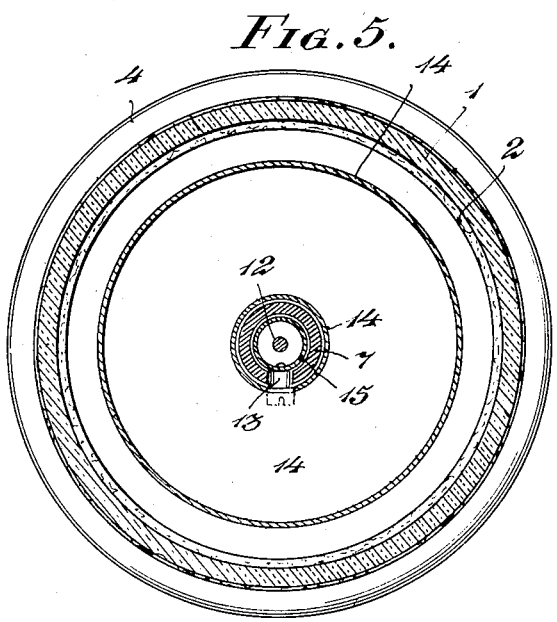
INVENTOR
Juan Werner Luis Sekkel
By John B. Brady
attorney

Patented May 2, 1950

2,506,240

UNITED STATES PATENT OFFICE 2,506,240

MEASURING TRAP CHAMBER WITH ADJUSTABLE FLOAT CONTROLLED CUTOFF

Juan Werner Luis Sekkel, Buenos Aires, Argentina

Application October 27, 1945, Serial No. 625,076
In Argentina September 21, 1945

5 Claims. (Cl. 222—67)

My invention relates to an apparatus intended for distributing liquids in predetermined quantities, for instance ¼, ½, ¾ and 1 liter, the measurement of which quantities is being made accurately and automatically. It is obvious that in practice said quantities may be varied according to the capacity to be given to the apparatus.

As will be seen hereinafter, the measuring apparatus of this invention is exceedingly simple; it comprises a transparent measuring container in which a float is raised by the incoming liquid and the movement of which, on reaching predetermined heights corresponding to predetermined measures, is used for closing the inlet valve.

This apparatus is preferably intended for the distribution of oils, wines, milk, and generally of more or less fluid liquids of any description, in small quantities, for instance from one quarter of a liter to one liter, and it solves an important commercial problem, not only owing to the simplicity, speed and accuracy with which the measuring is being done, but also to the cleanliness and to the economy in containers.

For the sake of clearer understanding of these specifications, same have been accompanied by detailed drawings, in which:

Figure 1 shows in front elevation a liquid measuring apparatus constructed according to my invention;

Fig. 2 shows, on a larger scale, a central longitudinal section of Fig. 1.

Fig. 3 is a plan projection in cross section on line A—B of Fig. 2.

Figs. 4 and 5 show respectively cross sections on lines C—D and E—F of Fig. 2.

Fig. 6 shows in elevation and partially in cross section the head in which are placed the volume selecting buttons.

In said drawings reference character 1 designates the measuring container, preferably of glass, held against fitting washers 2 and 3 between plates 4 and 5. Air-tight fitting is obtained through action of nut 6 which threading on the upper end of pipe 7 presses down plate 5, forcing container 1 to press against plate 4 and bringing said plate 4 to rest against packing 8 arranged on the upper seat of tap 9 unto which is threaded the lower end of pipe 7.

Tap 9 is a two way valve, being closed in position a, the liquid measuring container communicating with the interior of tap 9 in position b and providing a discharge connection with said tap and the outside, in order to take out the measured liquid, in position c.

In the chamber formed in the upper part of the tap there is a stop 10 against which valve cone 11 comes to rest. Valve cone 11 is formed or fixed to the lower end of rod 12 and which, on being raised by the latter, fits into the opening formed by the lower end of pipe 7. That part of pipe 7 which is included in the inside container 1 is open, presenting a longitudinal opening which serves as a guide for bolts 13 adapted to keep float 14 secured in tube 15 which moves inside said pipe 7.

Tube 15 penetrates into the inside of head 16 which is fixed to plate 5 by means of screws 17. Screws 17 have openings extending therethrough for the passage of the binding 18 is intended to prevent unlawful opening of the device or alteration of the predetermined measurements established by the competent authorities.

Tube 15 on being raised by float 14 establishes contact with and raises the disc 19 which has been pushed inwards by its respective buttton 20, and which is the position shown on Fig. 2 corresponding to a half liter.

Disc 19 moves along a rod 21 held in position by fork 22, which in turn is secured to the end of stem 23 acted upon by button 20. Said stem 23 is driven by the action of a spring 24 and forms a conical section 25 intended for raising retention plate 26 upon button 20 being pressed down. Plate 26 is guided for longitudinal movement through elongated openings and containing bolts 27. The plate 26 is acted upon by a spring 28 which has for its object to control the position of each of the borings in said plate through which stems 23 with the conical sections 25 thereon may pass, and face the latter with a certain amount of eccentricity; so that upon the conical section 25 moving forward, said plate 26 is displaced to clear it, returning to the initial position when the movement of stem 23 reaches its limit, in which case said plate 26 prevents the stem 23, or said button 20, from going backwards. It should be noted that on pressing one button 20, before same is retained, the other buttons are released and sent back, owing to the fact that on moving plate 26 the respective boring move into registry with the diameter of the conical section 25 before actually retaining the lastly introduced conical section 25.

Each disc 19 takes up a position in front of a respective sleeve 29 secured on rod 12.

For clearness sake, I have only referred to one set or complete mechanism belonging to each one of the buttons, as the four shown are exactly alike. As will be evident, the number of buttons may be increased or decreased.

The apparatus works in following manner:

Assuming that tap 9 is conveniently connected to the liquid measuring container, the handle is brought to position b which makes the liquid flow into measuring container 1 as indicated by arrows. Before establishing the inflow of the liquid it is necessary to determine the quantity desired to be distributed, pressing down button 20 indicating said quantity. Assuming as an example that ½ liter is desired corresponding to the position shown in Fig. 2.

As the liquid penetrates into measuring container 1, float 14 is raised and tube 15, as shown in Fig. 2, commences to raise disc 19, and the latter in turn raises sleeve 29 and therefore rod 12, until conical section 11 closes and seals the opening of pipe 7. At this time a quantity of liquid corresponding exactly to half a liter shall have been admitted.

In order to deliver the liquid contained in measuring container 1, the handle of the tap is moved to the position shown at C.

As the liquid is flowing out from the tap float 14 goes down together with tube 15 until they reach the position shown in Fig. 2. The small disc 19 also descends, and therefore also sleeve 29, the conical section or valve 11 going to rest against stop 10. Button 20 for ½ liter is retained by plate 26 allowing the operation to be repeated, or until it is released when any of the other buttons are pressed down in order to select the respective quantity.

In the apparatus shown, one liter is given as the largest quantity that can be measured in each operation; but it is evident that without departing from the spirit of my invention, it is possible to produce apparatus for measuring much larger quantities.

I claim:

1. Measuring apparatus for delivering liquids comprising a measuring container connected to a two-way valve, a float operative within said measuring container, a tube connected with said float, displaceable stops connected with corresponding indicator buttons supported above said measuring container, a rod extending vertically through said tube, sleeves carried by said rod at intervals substantially aligned with said displaceable stops, and a valve carried by the lower end of said rod for controlling the admission of liquid into the measuring container when the liquid admitted into said measuring container reaches the quantity indicated by the indicator button as determined by abutment of said tube with a selected displaceable stop coacting with an aligned sleeve on said rod.

2. Measuring apparatus for delivering liquids according to claim 1 in which the measuring container is formed by a tubular body of transparent material, a pair of header plates supporting said tubular body, a pipe member extending centrally through said tubular body and surrounding said tube, said pipe member being screw-threaded on its upper end above one of said header plates, securing means engaging said screw-threaded end for confining said header plate in position, said pipe being screw-threaded at its lower end and connected with said two-way valve for confining said other header and said tubular body in position.

3. Measuring apparatus according to claim 1 in which a control valve for the measuring container is disposed between said two-way valve and the lower end of said pipe and wherein said control valve is sealed by a cone fixed to the lower end of said rod.

4. Measuring apparatus for liquids according to claim 1 in which each indicator button is secured to the end of a stem member having a conical-cylindrical section, and a coacting spring-controlled plate having apertures therein registerable with said conical-cylindrical sections for releasing the button previously actuated and retaining the instantly actuated button.

5. Measuring apparatus for delivering predetermined quantities of liquid comprising a measuring container, a two-position supply and delivering valve connected with the lower end of said container for effecting in one position the supplying of the liquid to the container and in the other position the delivery of liquid from the container, a cut-off valve associated with said two-position valve, a vertically extending rod member connected with said cut-off valve, a tubular guide member extending through said measuring container, a float encircling said tubular guide member and vertically movable thereon, a sleeve member disposed within said tubular guide member and connected with said float, a tubular housing supported with respect to the upper end of said measuring container, a plurality of selectively depressible stop members distributed along said tubular housing in spaced positions corresponding to measured quantities of fluid admitted to said measuring container, said depressible stop members being selectively projectable to positions within said tubular housing for forming limiting abutments with the upper end of said tubular sleeve member and a multiplicity of adjustable sleeve members carried by said rod member substantially in alignment with said selectively projectable stops whereby the upper end of said tubular sleeve member coacts with a selected projected stop and an associated sleeve member for effecting the operation of said cut-off valve when said measuring container has received a predetermined supply of liquid.

JUAN WERNER LUIS SEKKEL.

REFERENCES CITED

The following references are of record in the file of this patent:

UNITED STATES PATENTS

| Number | Name | Date |
| --- | --- | --- |
| 1,231,006 | Flint | June 26, 1917 |
| 1,366,814 | McKallip | Jan. 25, 1921 |
| 1,408,901 | Mixter | Mar. 7, 1922 |
| 2,242,288 | Davis | May 20, 1941 |